United States Patent
Oogiichi et al.

[11] Patent Number: 5,953,086
[45] Date of Patent: Sep. 14, 1999

[54] LIQUID CRYSTAL DISPLAY DEVICE WITH PROTECTION CIRCUIT FOR ELECTROSTATIC BREAK DOWN

[75] Inventors: Kimitoshi Oogiichi; Masahiko Suzuki, both of Mobara, Japan

[73] Assignee: Hitachi, Ltd., Tokyo, Japan

[21] Appl. No.: 08/854,745

[22] Filed: May 12, 1997

[30] Foreign Application Priority Data

May 13, 1996 [JP] Japan ................................. 8-117205

[51] Int. Cl.$^6$ ................................................ G02F 1/1333
[52] U.S. Cl. ............................................. 349/40; 349/139
[58] Field of Search .............................. 349/40, 42, 139, 349/43

[56] References Cited

U.S. PATENT DOCUMENTS

| | | | |
|---|---|---|---|
| 5,719,647 | 2/1998 | Fujikawa et al. | 349/40 |
| 5,748,267 | 5/1998 | Natori et al. | 349/40 |
| 5,841,490 | 11/1998 | Matsuo | 349/40 |

Primary Examiner—Robert H. Kim
Assistant Examiner—Zandra V. Smith
Attorney, Agent, or Firm—Antonelli, Terry, Stout & Kraus, LLP

[57] ABSTRACT

A liquid crystal display device has an insulating first substrate, a plurality of pixels, a plurality of image signal lines, a plurality of scanning signal lines, first and second common wirings disposed on the first substrate outside the display area constituted by a plurality of the pixels, a first electrostatic protection circuit disposed between the first common wiring and the scanning signal line for causing static electricity occurring in the scanning signal line, a second electrostatic protection circuit disposed between the second common wiring and the image signal line for causing static electricity occurring in the image signal line to flow through the second common wiring, a transparent second substrate opposing the surface of the first substrate on which the first and second common wirings are disposed, through a liquid crystal layer, and a conductor disposed between the first and second substrates for electrically connecting electrodes disposed on the second substrate to terminals disposed on the first substrate, wherein the first and second common wirings are electrically connected by a conductor member made of the same material as that of the conductor.

4 Claims, 4 Drawing Sheets

LIQUID CRYSTAL DISPLAY DEVICE WITH PROTECTION CIRCUIT FOR ELECTROSTATIC BREAK DOWN

BACKGROUND OF THE INVENTION

This invention relates to a liquid crystal display device, and more particularly to a liquid crystal display device of the active matrix type.

In an active matrix type liquid crystal display device, a group of gate signal lines (scanning signal lines) and a group of drain signal lines (image signal lines) are so formed as to cross one another on the surface of one of a pair of transparent substrates which oppose each other through a liquid crystal layer, on one side of the liquid crystal, and each pixel area encompassed by these signal lines includes a thin film transistor for supplying a drain signal (image signal) through the drain signal line to a pixel electrode when a gate signal (selection signal) is supplied through the gate signal line.

The group of the gate signal lines and the group of the drain signal lines are formed by a microminiaturization process utilizing so-called photolithography. It is therefore customary to inspect whether or not each signal is formed in a disconnected state, or whether or not a short-circuit occurs between the signal lines, during the production process of the liquid crystal display device.

In this case, the inspection is carried out by forming an inspection terminal to which the group of the gate signal lines are connected in common and an inspection terminal to which the group of the drain signal lines are connected in common, on the transparent substrate surface which is to be cut off and separated later, and by bringing an inspection probe into contact with each terminal.

Since the thin film transistor is formed as a MIS transistor by using a part of the area of the group of gate signal lines as its gate electrode and an area where the drain signal lines extend as a drain electrode, measures are taken so as to prevent the signal lines from being concentratedly charged by static electricity and to thus prevent fluctuation of its threshold voltage or its breakdown.

In other words, static electricity is dispersed by forming common wirings for electrostatic protection outside the display area into which the liquid crystal is sealed in and which comprises a group of the pixel areas, and by connecting these common wirings to the gate signal lines and the drain signal lines through electrostatic protection circuits (diodes for electrostatic protection).

SUMMARY OF THE INVENTION

However, the liquid display device having the construction described above is not free from the following problems. First, when it is intended to carry out inspection of the disconnection or short-circuit efficiency and with high reliability during the production of the liquid crystal display device, the countermeasure against static electricity affecting the thin film transistor cannot be taken sufficiently. Second, when a countermeasure against static electricity affecting the thin film transistor is sufficiently attempted, on the contrary, the inspection of the disconnection or short-circuit conditions of the signal line cannot be made efficiently and with high reliability.

In other words, since the signal lines must be connected in common (inclusive of the case where connection is made through electrostatic protection diodes, too) in both of these countermeasures, it has been difficult to satisfactorily achieve one of the countermeasures without sacrificing the other.

The present invention is completed in view of the problems described above, and aimed at has the object of providing a liquid crystal display device in which disconnection or short-circuit of the signal lines can be inspected and in which sufficient countermeasures can be taken against static electricity affecting the thin film transistors.

The object of the invention described above can be accomplished by a liquid crystal display device which comprises:

an insulating first substrate;

a plurality of pixels disposed on the first substrate and comprising a pixel electrode and a thin film transistor for selecting the pixel electrode;

a plurality of image signal lines for supplying an image signal to the thin film transistor of a corresponding one of the pixels;

a plurality of scanning signal lines for supplying a selection signal to the thin film transistor of the corresponding one of the pixels;

first and second common wirings disposed on the first substrate outside the display area constituted by a plurality of the pixels;

a first electrostatic protection circuit, disposed between the first common wiring and the scanning signal lines, for causing static electricity occurring in the scanning signal line to flow through the first common wiring;

a second electrostatic protection circuit, disposed between the second common wiring and the image signal line, for causing static electricity occurring in the image signal line to flow through the second common wiring;

a transparent second substrate opposing the surface of the first substrate, on which the first and second common wirings are disposed, through a liquid crystal layer;

and a conductor, disposed between the first and second substrates, for electrically connecting electrodes disposed on the second substrate to terminals disposed on the first substrate;

wherein the first and second common wirings are electrically connected by a conductor member made of the same material as that of the conductor.

In the liquid crystal display device having such a construction, the common wirings for electrostatic protection can be formed in a disconnected state at necessary portions during the production process of the liquid crystal display device. Because, when the liquid crystal cell is constituted by using the other transparent substrate in a subsequent process, the disconnected portions can be completely connected by the conductor.

When the common wirings for electrostatic protection can be formed in this way, each signal line can be constituted without being affected electrically by the common wirings for electrostatic protection even when the inspection terminal to which the gate signal lines are connected in common and the inspection terminal to which the drain signal lines are connected in common are formed on the surface of the transparent substrate which is to be cut off later.

Accordingly, the inspection of disconnection or short-circuit conditions of each signal line and a counter-measure against static electricity affecting the thin film transistor can be sufficiently taken.

DESCRIPTION OF THE PREFERRED EMBODIMENTS

Figure 2:
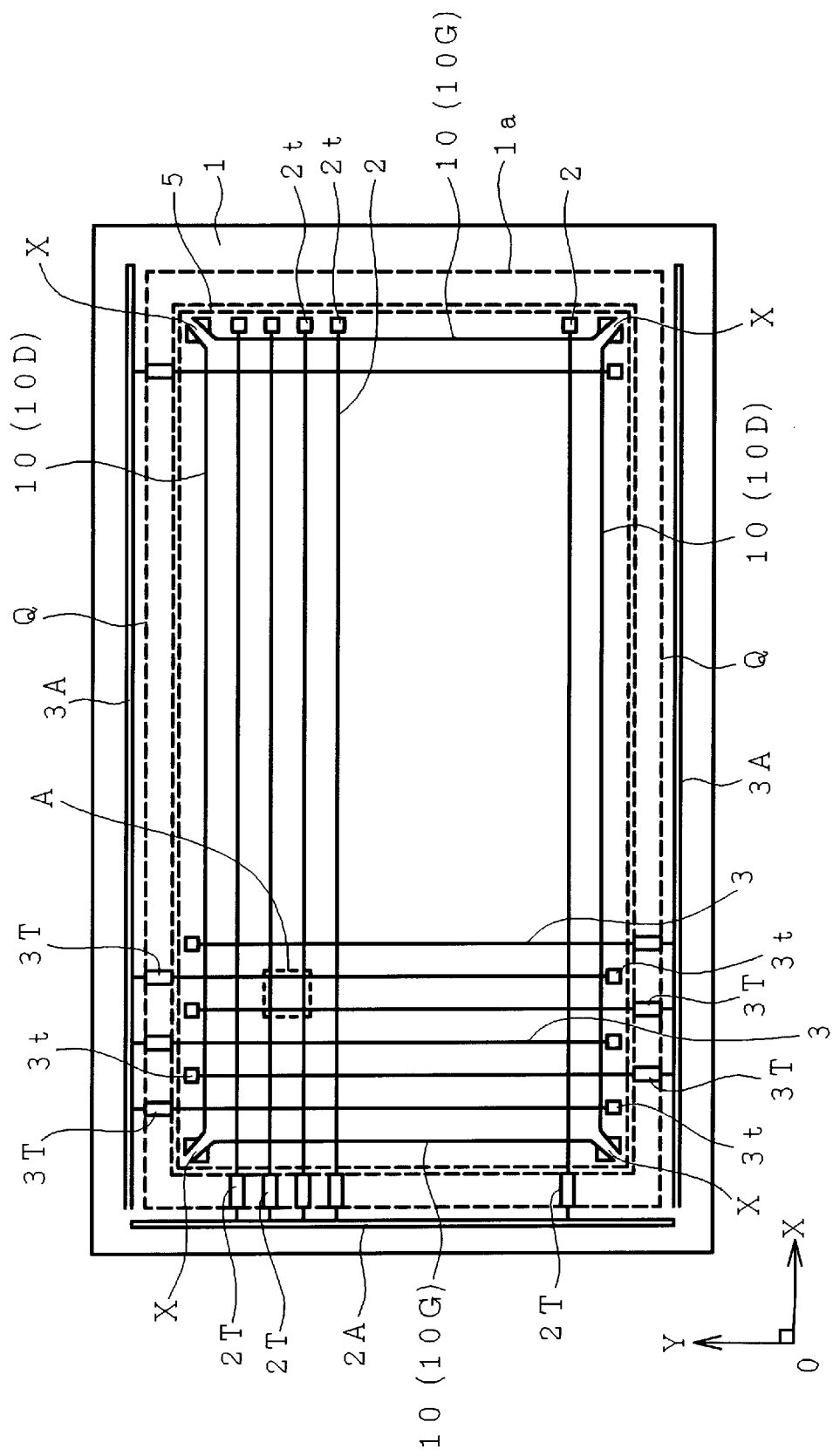
FIG. 2 is a plan view showing one embodiment on the liquid crystal side of one of the glass substrates of the liquid crystal display device of the present invention.

FIG. 2 is a plan view showing the construction of the surface of one of the glass substrates constituting the liquid crystal display device of the present invention on the liquid crystal side. This glass substrate is in a state wherein a disconnection or short-circuit condition of each signal line can be inspected.

In the drawing, a glass substrate 1 has a size somewhat greater than the glass substrate that actually constitutes the liquid crystal display device. In other words, this glass substrate 1 is cut along dotted line Q in the drawing in a subsequent process and its peripheral regions are removed.

Gate signal lines 2 extending in an x-direction and juxtaposed in a y-direction in the drawing are formed on the surface of the glass substrate 1 on the liquid crystal side, and drain signal lines 3 extending in the y-direction and juxtaposed in the x-direction are so formed as to be insulated from these gate signal lines 2.

Figure 3:
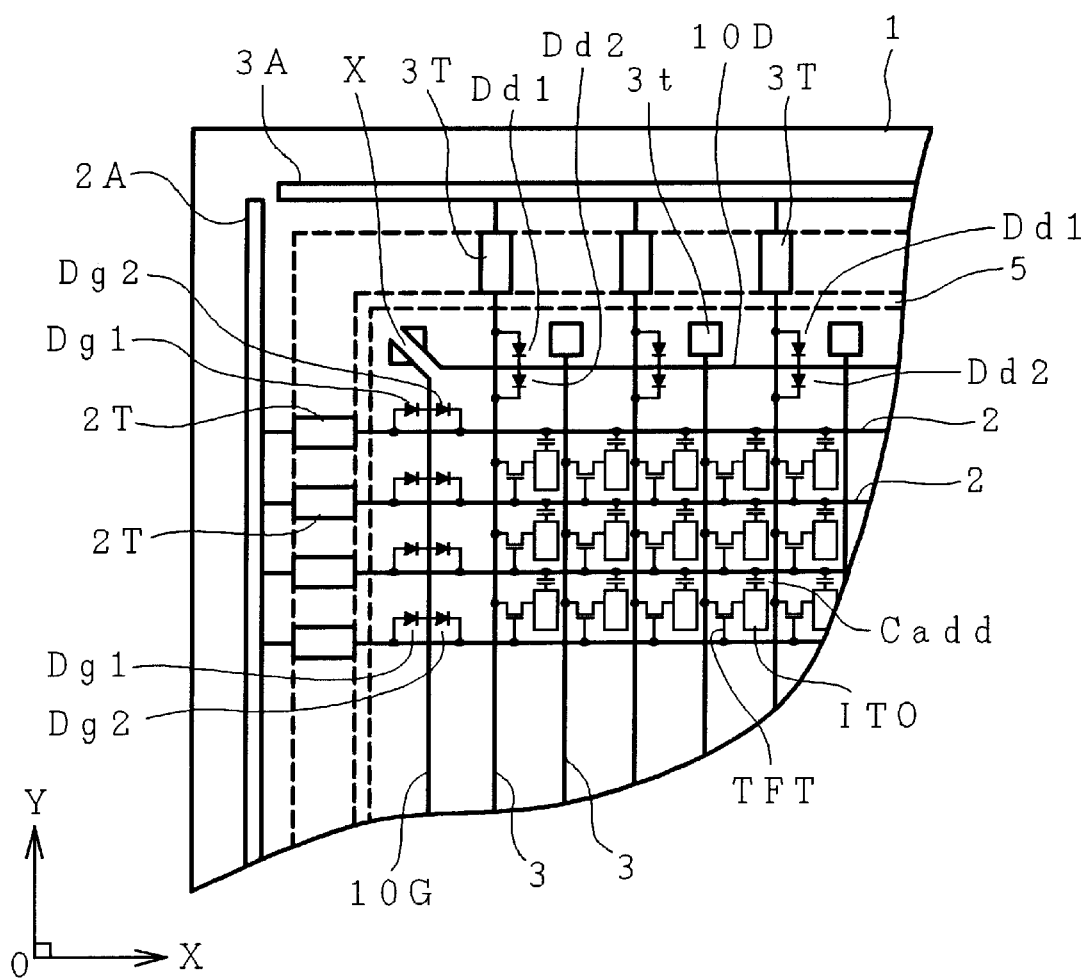
FIG. 3 is an enlarged diagrammatic view showing the upper left-hand portion of the glass substrate shown in FIG. 2.

A rectangular area encompassed by each gate signal line 2 and each drain signal line 3 (for example, the area encompassed by dotted line A) becomes a pixel area. As shown in FIG. 3 which is an enlarged view of a part (upper left-hand portion) of FIG. 2, this area includes a thin film transistor TFT, which is turned on by a gate signal from the gate signal line 2, and a transparent pixel electrode ITO to which a drain signal from the drain signal line 3 is applied through the thin film transistor TFT when it is turned on. The pixel area further includes an additional capacitor Cadd so as to accumulate the drain signal for a long time when the thin film transistor TFT is turned off.

Therefore, in the pixel area on the line of the gate signal line 2 to which the gate signal is applied, the drain signal (pixel signal) is supplied to the pixel electrode ITO from each signal line 3, and a potential difference is generated between this pixel electrode ITO and a common electrode formed on the other glass substrate on the liquid crystal side, not shown, so as to modulate the light transmission factor of the liquid crystal in that region.

One of the ends (left-hand end portion in the drawing) of each gate signal line 2 extends to the position on the surface of the glass substrate which is later cut off in the subsequent process, and is connected in common to a common terminal 2A for inspection. Each gate signal line 2 has a relatively large width in the proximity of the portion which later will become an actual glass substrate 1a after separation and forms an external terminal 2T. Further, a terminal 2t for individual inspection is formed at the other end (right-hand end portion in the drawing) of each gate signal line.

Similarly, each of the drain signal lines 3 extends at one of the end portions thereof to a position on the surface of the glass substrate which is later cut off in a subsequent process, and is connected in common to a common terminal 3A for inspection, which is formed at this portion. Each drain signal line 3 has a relatively large width in the proximity of the portion which will become an actual glass substrate 1a after cut-off and forms an external terminal 3T. Further, a terminal 3t for individual inspection is formed at the other end of each drain signal line 3.

In this case, the drain signal lines 3 have a construction such that the drain signals are supplied to them by image driving circuits disposed on the upper and lower sides in the drawing. Therefore, every other one of the drain signal lines 3 will include an external terminal 3T on the upper side in the drawing which are connected in common to the common terminal 3A for inspection. The other drain signal lines 3 include the external terminal 3T on the lower side in the drawing and are connected in common to the common terminal 3A for inspection.

A common wiring 10 for so-called electrostatic protection is formed between a sealing material 5 encompassing the area into which the liquid crystal is sealed and a display area comprising the group of the pixel areas.

This common wiring 10 for electrostatic protection comprises a common wiring 10G for first electrostatic protection which extends in an orthogonal direction while being insulated from each gate signal line 3 and is connected to each gate signal line 3 through a diode for electrostatic protection (not shown in FIG. 2) and a common wiring 10D for second electrostatic protection which extends in an orthogonal direction while being insulated from each drain signal line 2 and is connected to the drain signal line through a diode for electrostatic protection (not shown in FIG. 2).

In this case, the common wirings 10G for first electrostatic protection are formed on both sides (right and left sides in the drawing) of the gate signal lines 3 and the common wirings 10D for second electrostatic protection are formed on both sides (upper and lower sides in the drawing) of the drain signal lines 3.

As shown in detail in FIG. 3 (corresponding to the upper left-hand portion of FIG. 2) but not shown in FIG. 2, the diode for electrostatic protection comprises a diode Dg1 connected in the forward direction between each gate signal line 2 on the external terminal 2T (terminal 2t for inspection on the other-side) side, and the common wiring 10G for first electrostatic protection and a diode Dg2 connected in the forward direction between the common wiring 10G and the gate signal line 2 on the display area side, in connection with each of the gate signal line 2. As to each of the drain signal lines 3, the diode for electrostatic protection comprises a diode Dd1 connected in the forward direction between the drain signal line 3 on the external terminal 3T (terminal 3t for inspection on the other hand) side and the common wiring 10D for second electrostatic protection and a diode Dd2 connected in the forward direction between the common wiring 10D and the drain signal line 3 on the display area side.

Incidentally, each of these diodes is of a MIS type fabricated in substantially the same production process as the thin film transistor TFT inside the display area, and is formed in a state that its gate electrode and its drain electrode are connected.

Figure 4:
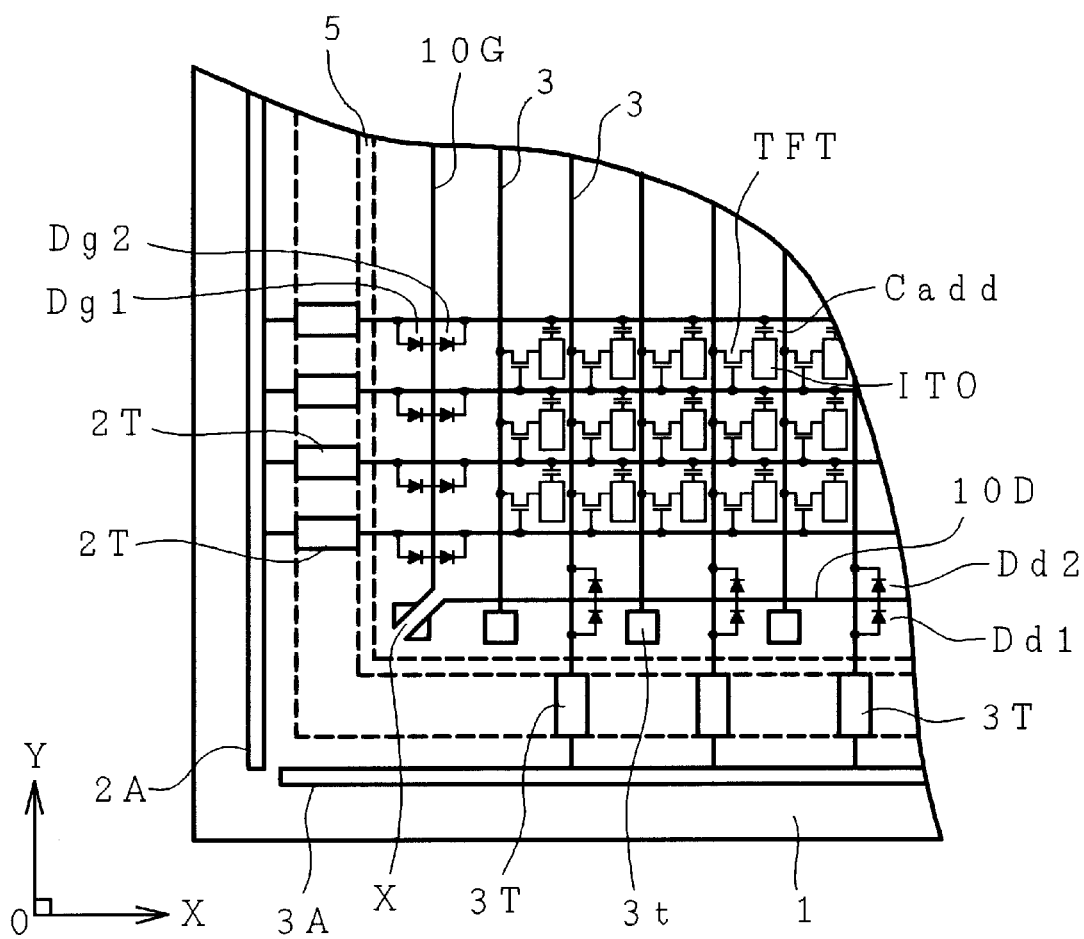
FIG. 4 is an enlarged diagrammatic view showing the lower left-hand portion of the glass substrate shown in FIG. 2.

As can be seen from FIG. 4, showing in detail the lower left-hand portion of the glass substrate 1 shown in FIG. 2, one diode for electrostatic protection, which is formed between the drain signal line 3 and the common wiring 10D for second electrostatic protection, is disposed on one of the sides of the display area and on the opposite side to the diode for electrostatic protection disposed on the adjacent drain signal line 3.

In other words, the electrostatic protection diodes on the gate signal lines 2 are disposed at the same positions (portions on one of the sides of the display area) in the same way as the adjacent gate signal lines 2, whereas the electrostatic protection diodes on the drain signal lines 3 are disposed at every other position on one of the sides of the display area, in order to carry out an inspection of the disconnection or short-circuit condition of each signal line 2, 3 as will be later described in detail.

In this embodiment, the common wiring 10G for first electrostatic protection and the common wiring 10D for second electrostatic protection are formed in such a way as to be electrically insulated from each other through an insulation portion X.

As can be seen from FIG. 2, for example, the isolation portion X is positioned at each corner of the display area and moreover, the end portion of each common wiring 10G, 10D at the isolation portion X has a relatively large area.

The glass substrate 1 formed at this stage is fundamentally completed as the transparent substrate of one of the substrates of the liquid crystal display device and at this point, the disconnection or short-circuit condition of each signal line 2, 3 is inspected.

For example, the inspection is carried out in the following way.
(1) Inspection between the gate signal line 2 and the drain signal line 3:

An inspection probe is brought into contact between the common terminal 2A on the gate signal lines 2 side and the common terminal 3A on the drain signal lines 3 side, and a current flowing between them is measured. Any short-circuit between the gate signal line 2 and the drain signal line 3 can be detected by the measured value.

In this case, the common wiring 10G for electrostatic protection on the gate signal lines 2 side and the common wiring 10D for electrostatic protection on the drain signal lines 3 side are electrically isolated from each other as already described. Therefore, the inspection of a short-circuit condition between the gate signal lines 2 and the drain signal lines 3 can be effected without being affected at all by these common wirings.
(2) Inspection of a short-circuit between drain signal lines 3:

The inspection probe is brought into contact between the common terminal 3A on one of the sides (upper side in the drawing) of the drain signal lines 3 and the common terminal 3A on the other side (lower side in the drawing), and a current flowing between them is measured. A short-circuit between the drain signal lines 3 can be detected by the measured value.

In this case, when the diode for electrostatic protection is formed on each drain signal line 3 on one of the sides thereof (upper side in the drawing), the diode for electrostatic protection is not formed on the other side in the construction of the invention. In other words, the adjacent drain signal lines 3 are completely insulated electrically from one another. Therefore, the inspection can be carried out with high reliability.
(3) Inspection of a disconnection of each signal line:

The inspection probe is brought into contact between the common terminal (2A or 3A) of the signal line to be inspected and the independent terminal (2t or 3t) of the signal line, and the current flowing between them is measured.

Because the common wirings, etc, of the diodes for electrostatic protection employ the construction described above, the inspection of a disconnection or short-circuit condition of each signal line can be carried out efficiently and with high reliability.

The glass substrate 1 in which a disconnection or short-circuit is not found in this way is used to constitute the liquid crystal display device with the other glass substrate different from this glass substrate 1. Here, the other glass substrate has the common transparent electrodes which have been already formed on the face thereof on the liquid crystal side and which are common to each pixel area, and with color filters if this liquid crystal display device is a color display device.

Figure 1:
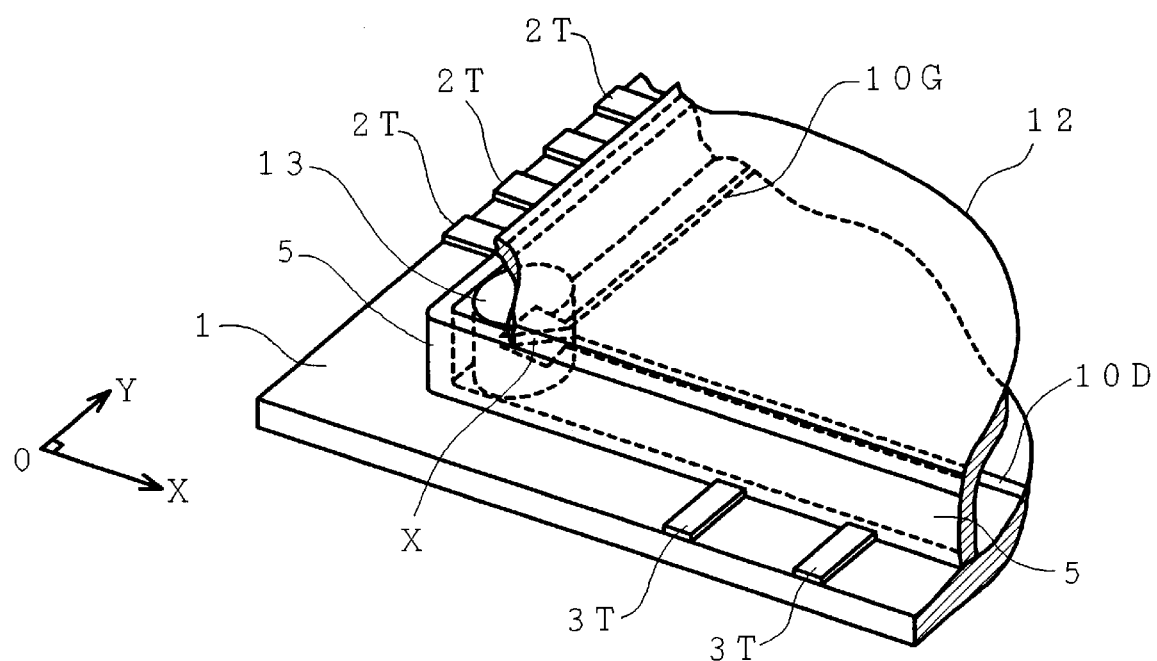
FIG. 1 is a perspective view partly in section showing essential portions of a liquid crystal display device forming one embodiment of the present invention.

FIG. 1 is a partial exploded perspective view showing the state wherein the other glass substrate 12 is assembled with the glass substrate 1 described above on the liquid crystal side of the latter. Though the portion of the glass substrate 1 where its inspection terminals 2A and 3A are formed are cut and separated in this drawing, this cut and separation may be naturally carried out before or after this assembly.

In this drawing, the other glass substrate 12 is disposed on the glass substrate 1 on the liquid crystal side through the sealing material so that the peripheral portion of the other glass substrate 12 can be positioned to the portion of the sealing material 5.

In this case, the other glass substrate 12 is disposed while the conductor 13 is disposed at the isolation portion X of the common wiring layers 10G and 10D of the diodes for first and second electrostatic protection of the glass substrate 1 in this embodiment. Because the end portion of each common wiring layer 10G, 10D at this isolation portion X has a relatively large area as already described, the conductor 13 can be disposed in such a way as to sufficiently extend over them. Moreover, since the conductor 13 is sandwiched between the glass substrates 1 and 12, it can maintain its position as it is.

This conductor 13 is disposed in order to electrically connect the common wiring layers 10G and 10D for first and second electrostatic protection, which are so formed as to be mutually isolated on the glass substrate 1, at the time of the assembly of the liquid crystal display device. Therefore, the material of the conductor 13 is not particularly limited so long as this purpose can be achieved.

However, the conductor for leading out the common electrodes, formed on the surface of the other glass substrate 12 on the liquid crystal side, to the external terminal side formed on one of the glass substrates 1 is ordinarily made of a conductive paste, such as a silver paste or a conductive bead having a conductor film formed on the surface of a plastic bead. Therefore, when these conductors are used as they are, the trouble of separately forming the conductor 13 can be eliminated.

When the common wirings 10G and 10D for first and second electrostatic protection are mutually connected at the time of assembly of the liquid crystal display device as described above, the inspection of a disconnection or short-circuit condition of each signal line to be carried out prior to the assembly can be made without being affected by the common wirings 10G and 10D, and subsequent countermeasures for preventing static electricity can be effected with high reliability. Because the common wirings 10G and 10D for first and second electrostatic protection are mutually connected, static electricity can be quickly dissipated even when a charging of static electricity occurs.

The liquid crystal cell of the liquid crystal display device is constituted in this way, and the liquid crystal is sealed in between the glass substrate 1 and the glass substrate 12 through a feed port disposed in advance in a part (not shown) of the sealing member 5. After the liquid crystal is sealed in, the feed port formed in the sealing member 5 is naturally closed completely.

As is obvious from the foregoing explanation, the liquid crystal display panel according to the present invention can form the common wirings for electrostatic protection to be formed during its production process, with the necessary portions in a disconnected state.

When the common wirings for electrostatic protection can be formed in this manner, even when the inspection terminal to which the gate signal lines are connected in common and the inspection terminal to which the drain signal lines are connected in common are formed on the surfaces of the transparent substrates that are later cut off, each of these signal lines can be constituted without being effected at all electrically by the common wirings for electrostatic protection.

Accordingly, the inspection of a disconnection or short-circuit condition of each signal line and the measures for preventing static electricity for the thin film transistors can be sufficiently achieved.

In the embodiment described above, the common terminals for inspecting each signal line, etc, are formed as shown in the drawings, but they are not particularly limited to the arrangement shown in the drawing. When the common wirings 10G and 10D for electrostatic protection are formed to be freely isolated, the possibility that the common terminals for inspection can be formed more effectively than in this embodiment can be obtained.

The embodiment described above employs the construction wherein the drain signal lines 3 are fed with a drain signal by the image driving circuits disposed on the upper and lower sides of the glass substrate 1, respectively. Therefore, the drain signal lines 3 that are alternately disposed are equipped with the external terminal 3T on the upper side and the drain signal lines 3 are equipped with the external terminals 3T on the lower side. However, the present invention is not particularly limited to this construction. In other words, a similar effect can be naturally obtained by disposing all the external terminals 3T on one of the sides of the glass substrate 1, which are connected in common to the common terminal 3A for inspection.

As is obvious from the foregoing description, a liquid crystal display device according to the present invention can sufficiently carry out the inspection of a disconnection or short-circuit condition of the signal lines and can take sufficient countermeasures against static electricity affecting the thin film transistors.

What is claimed is:

1. A liquid crystal display device comprising:

an insulating first substrate;

a plurality of pixels disposed on said first substrate and comprising a pixel electrode and a thin film transistor for selecting said pixel electrode;

a plurality of image signal lines for supplying an image signal to the thin film transistor of a corresponding one of said pixels;

a plurality of scanning signal lines for supplying a selection signal to said thin film transistor of said corresponding one of said pixels;

first and second common wirings disposed on said first substrate outside the display area constituted by a plurality of said pixels;

a first electrostatic protection circuit, disposed between said first common wiring and said scanning signal lines, for causing static electricity occurring in said scanning signal line to flow through said first common wiring;

a second electrostatic protection circuit, disposed between said second common wiring and said image signal line, for causing static electricity occurring in said image signal line to flow through said second common wiring;

a transparent second substrate opposing the surface of said first substrate on which said first and second common wirings are disposed through a liquid crystal layer; and a conductor, disposed between said first and second substrates, for electrically connecting electrodes disposed on said second substrate to terminals disposed on said first substrate;

wherein said first and second common wirings are electrically connected by a conductor member made of the same material as that of said conductor.

2. A liquid crystal display device according to claim 1, wherein each of said first and second electrostatic protection circuits is constituted by connecting a diode in the forward direction and a diode in the reverse direction in parallel with each other.

3. A liquid crystal display device according to claim 2, wherein each of said diode in the forward direction and said diode in the reverse direction is formed by using a MIS transistor and connecting the gate electrode of said MIS transistor to its source electrode.

4. A liquid crystal display device according to claim 3, wherein said MIS transistor is formed simultaneously with said thin film transistor.

* * * * *